(12) United States Patent
Bitter et al.

(10) Patent No.: US 7,954,317 B2
(45) Date of Patent: Jun. 7, 2011

(54) HYDRAULIC SYSTEM

(75) Inventors: Marcus Bitter, Mannheim (DE);
Hendrik Nordhoff, Havixbeck (DE);
Karsten Oberst, Ludwigshafen (DE)

(73) Assignee: Deere & Company, Moline, IL (US)

( * ) Notice: Subject to any disclaimer, the term of this patent is extended or adjusted under 35 U.S.C. 154(b) by 684 days.

(21) Appl. No.: 11/962,279

(22) Filed: Dec. 21, 2007

(65) Prior Publication Data

US 2009/0158727 A1 Jun. 25, 2009

(51) Int. Cl.
*F16D 31/02* (2006.01)
(52) U.S. Cl. .......................................... 60/456; 60/486
(58) Field of Classification Search .................. 60/456, 60/486
See application file for complete search history.

(56) References Cited

U.S. PATENT DOCUMENTS

| 4,335,577 | A | * | 6/1982 | Lobmeyer et al. ............. 60/421 |
| 5,020,324 | A |   | 6/1991 | MacDonald et al. |
| 5,615,553 | A | * | 4/1997 | Lourigan ........................ 60/486 |
| 6,834,736 | B2 | * | 12/2004 | Kramer et al. ............. 180/89.12 |

FOREIGN PATENT DOCUMENTS

| DE | 2 024 287 | 3/1971 |
| DE | 27 05 721 | 9/1977 |
| DE | 34 01 759 | 8/1985 |
| DE | 34 45 516 | 5/1986 |
| DE | 35 00 310 | 7/1986 |
| DE | 35 44 175 | 9/1986 |

* cited by examiner

*Primary Examiner* — F. Daniel Lopez

(57) ABSTRACT

A hydraulic system for an agricultural vehicle is proposed. The hydraulic system comprises a main hydraulic circuit, which is fed with hydraulic fluid by a main hydraulic pump, a variable displacement charge pump which supplies charge pressure to the main hydraulic pump, and a lubricating hydraulic circuits. In order to keep efficiency losses on the vehicle to a minimum, particularly at high engine speeds, part of the hydraulic fluid delivered by the charge pump can be diverted to the lubricating hydraulic circuit.

4 Claims, 3 Drawing Sheets

HYDRAULIC SYSTEM

FIELD OF THE INVENTION

The invention relates to a hydraulic system for an agricultural vehicle.

BACKGROUND OF THE INVENTION

In mobile work machines or agricultural vehicles, it is customary for the hydraulic components to be supplied by separate hydraulic circuits, such as a main hydraulic circuit or a transmission hydraulic circuit. Depending on the design type, the main hydraulic circuit is divided into different circuits or branches in order to supply steering, brake and other hydraulic components with hydraulic fluid.

A transmission hydraulic circuit normally includes both a transmission shift control circuit and a lubricating hydraulic circuit, so that both the transmission shifting and the lubrication and cooling of the bearings and other moving transmission parts are ensured.

Transmission hydraulic circuits are normally supplied by a cheap and simple fixed displacement pumps. However, such a fixed displacement pump must be designed to provide sufficient volumetric flow rate at idle and, as the engine speed increases, increasingly deliver excess unused hydraulic fluid into the tank. This produces unnecessary efficiency losses for the vehicle.

In the case of the main hydraulic circuits, in order to avoid such efficiency losses, variable or adjustable main hydraulic pumps or variable displacement pumps with load-sensing hydraulic systems are used. However, these variable displacement pumps generally have only a limited suction capacity, on account of which charge pumps are used, which supply or charge these variable displacement pumps with low-pressure hydraulic fluid. Charge pumps are usually constructed as fixed displacement pumps with good suction characteristics, so that, even when used in cold surroundings, a sufficient suction pressure is ensured. However, in the use of a charge pump configured as a fixed displacement pump, efficiency losses generally ensue, since the fixed displacement pumps must always deliver somewhat more hydraulic fluid than the variable displacement pump can maximally accept. The rest of the hydraulic fluid is led off to the tank. The efficiency losses rise if the variable displacement pump accepts, for instance, no hydraulic fluid, so that the whole of the hydraulic fluid delivered by the charge pump has to be diverted to the tank.

SUMMARY OF THE INVENTION

Accordingly, an object of this invention is to provide a hydraulic system with reduced efficiency losses.

According to the invention, a hydraulic system includes a variable displacement charge pump and at least a portion of the hydraulic fluid delivered by the charge pump can be diverted to supply the lubricating hydraulic circuit. The adjustable or variable charge pump thus supplies both the adjustable main hydraulic pump and the lubricating hydraulic circuit of the vehicle with the respectively required quantity of hydraulic fluid. In a preferred embodiment of the invention, a separate transmission shift control circuit for the shifting of couplings of a transmission is provided, at least a part-quantity of the hydraulic fluid delivered by the variable displacement pump being able to be branched off to supply the transmission shift control circuit. Since the pressure in the charge pressure branch is relatively low, it may be sensible to feed the required gearshift pressure branch for the shifting of couplings in the transmission with hydraulic fluid from the main hydraulic circuit, by according the necessary priority to the transmission shift control circuit.

In an alternative embodiment, a separate transmission shift control circuit for the shifting of couplings in a transmission with separate fixed displacement pump is provided, the transmission shift control circuit being supplied with hydraulic fluid by the fixed displacement pump. In this variant, the transmission shift control fluid would be operated independently from the variable displacement pump of the main hydraulic circuit.

In this case, preferably, a part-quantity of the hydraulic fluid, delivered by the fixed displacement pump, for the transmission shift control circuit can be branched off for charging of the variable displacement pump. The non-required hydraulic fluid of the gearshift pressure branch is then throttled down to support the charge pressure branch, for instance with a pressure-reducing valve or a simple pressure-relief valve, and is fed to the charge pressure branch or used to charge the main hydraulic pump. This would be all the more effective, the higher the engine speed, and thus the rotation speed of the fixed displacement pump of the gearshift pressure branch, becomes.

Part of the hydraulic fluid excessively delivered by the fixed displacement pump of the gearshift pressure branch can also be branched off to supply the lubricating hydraulic circuit in order to reduce the efficiency losses.

The lubricating hydraulic circuit is preferably used to lubricate transmission components of a transmission. In addition, the lubricating hydraulic circuit can also however be used to lubricate other low-pressure-lubricated components, such as, for instance, the axles of a vehicle, in particular the rear axle, or an axle transmission of one of the vehicle axles.

The main hydraulic circuit is preferably provided for the hydraulic supply of control valves, which are provided, in particular, to supply other hydraulic components on the vehicle, for instance mounted implements, front loaders, etc.

In particular, the main hydraulic circuit serves also for the hydraulic supply of a hydraulic coupling device, preferably a three-point coupling device. The hydraulic components provided on the coupling device are operated by the hydraulic fluid provided in the main hydraulic circuit, for instance including the lift cylinders on the links of the coupling device.

The main hydraulic circuit can additionally also be provided for a hydraulic supply of an axle suspension for an axle of the vehicle.

Furthermore, the main hydraulic circuit can be provided for the hydraulic supply of a cab suspension for a cab of the vehicle. The hydraulic supply of a brake system for the vehicle can likewise be given by the main hydraulic circuit.

If no separate steering hydraulic circuit with electric pump is provided, the main hydraulic circuit can also be provided for the hydraulic supply of a steering system for a steering of the vehicle.

A hydraulic system according to the invention has the advantage that, through the combination of various necessary low-pressure hydraulic circuites, considerable line savings for the vehicle can sometimes be obtained, since the supply of the different hydraulic components or consuming units can be realized in a relatively speed-independent and demand-driven manner by a main hydraulic circuit and a lubricating hydraulic circuit, compared with the conventional arrangements at least two constant flow pumps being able to be replaced by one adjustable charge pump. In addition, an advantage in terms of costs and development complexity is established, since, with respect to the lubricating hydraulic circuit, all lines and valves can be designed to a lower, constant-maintained lubricating fluid flow.

DESCRIPTION OF THE PREFERRED EMBODIMENT

Figure 1:
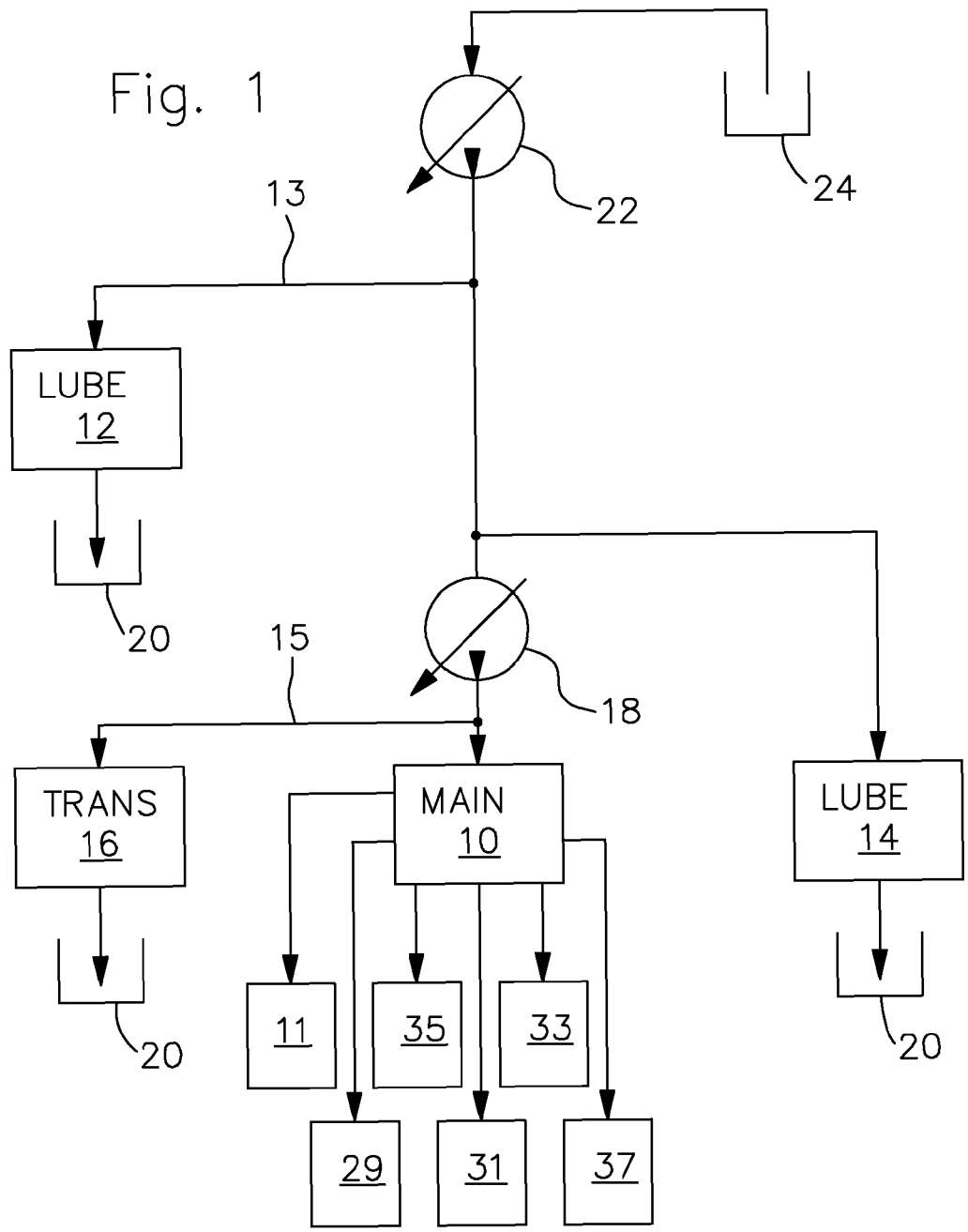
FIG. 1 is a block diagram of a hydraulic system according to the invention, with a main hydraulic pump supplying a transmission shift control circuit.

Referring to FIG. 1, the hydraulic system includes a main hydraulic circuit 10, a lubricating hydraulic circuit 12, 14, and a transmission shift control circuit 16. An variable displacement main hydraulic pump 18, for instance an adjustable or variable axial piston pump supplies the main hydraulic circuit 10. The individual hydraulic circuits 10, 12, 14, 16 are connected to corresponding return-flow reservoirs or hydraulic tanks 20, into which excess hydraulic fluid can be returned or drained. A branch line 15 communicates a portion of the hydraulic fluid delivered by the main hydraulic pump 18 to the transmission shift control circuit 16. The transmission shift control circuit controls the shifting of a transmission (not shown). A variable displacement charge pump 22 is connected to a hydraulic tank 24 and provides charge pressure to the main pump 18, and to the lubricating hydraulic circuit 12 via branch line 13. This hydraulic system is preferably used on agricultural machinery or vehicles and is suitable, in particular, for agricultural tractors.

The main hydraulic circuit 10 preferably supplies hydraulic fluid to one or more hydraulic systems or components. For example, the main hydraulic circuit 10 may supply fluid to a hydraulic hitch control system 35. The main hydraulic circuit 10 may supply fluid to a hydraulic axle suspension circuit 33 of the vehicle 30. The main hydraulic circuit 10 may supply fluid to hydraulic cab suspension circuit 37. The main hydraulic circuit 10 may supply fluid to a hydraulic brake system 31. The main hydraulic circuit 10 may also supply fluid to a vehicle steering system 29.

The lubricating hydraulic circuits 12 and 14 receive a low-pressure hydraulic fluid from charge pump 22. The lube circuits may included a transmission lube circuit which ensures a lubricant supply of the components of the transmission (not shown). The lubricating hydraulic circuits preferably also include an axle lube system (not shown) and/or an axle transmission lube system (not shown).

Figure 2:
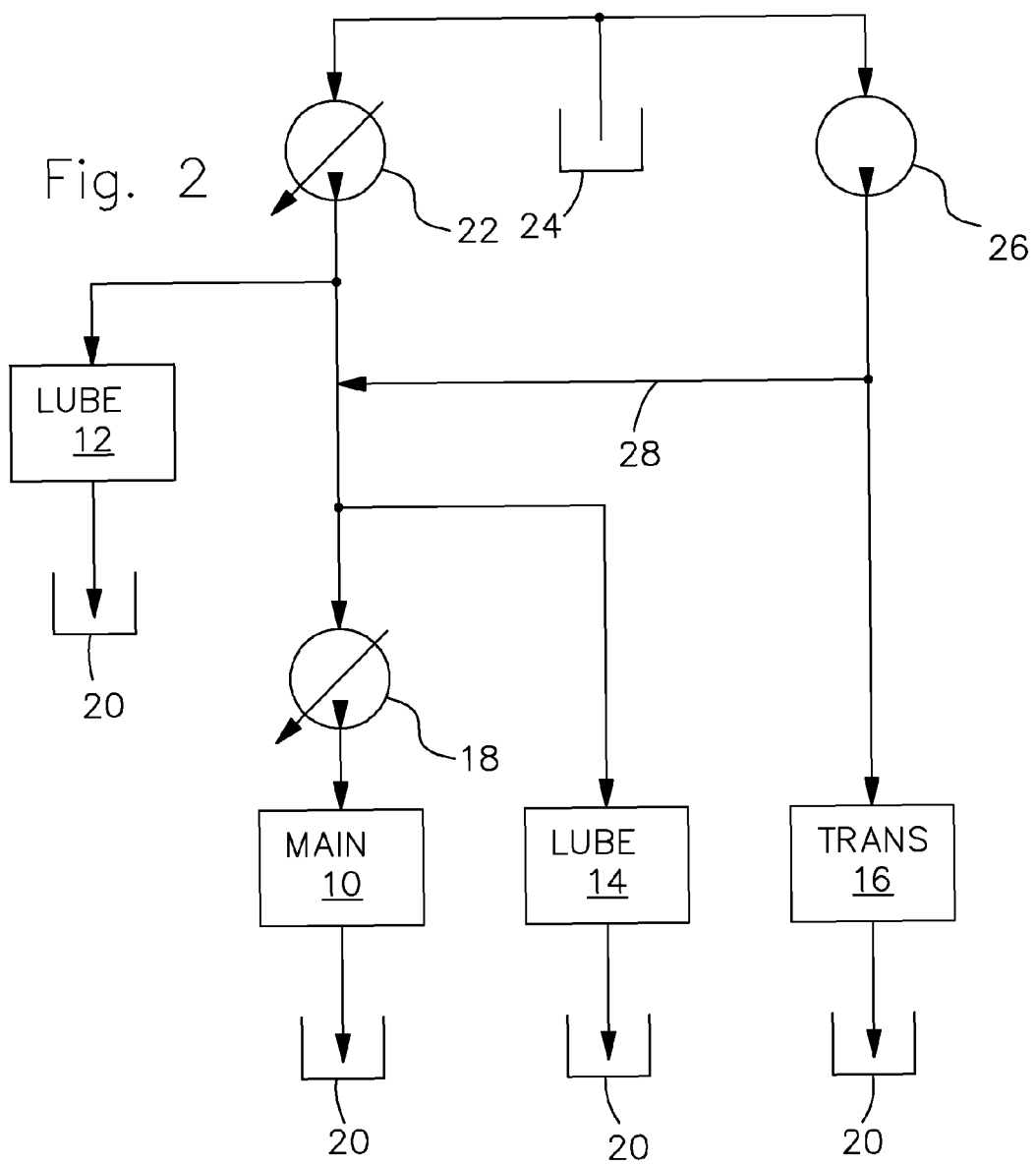
FIG. 2 is a block diagram of a further hydraulic system according to the invention, where a separate fixed displacement pump supplies the transmission shift control circuit.

FIG. 2 shows an alternative embodiment which is substantially similar to the embodiment of FIG. 1, but a fixed displacement pump 26 is operated in parallel to the charge pump 22 and supplies fluid to the transmission shift control circuit 16. The fixed displacement pump 26 may be a gear pump. In addition, a bypass line 28 communicates a portion of the hydraulic fluid from the fixed displacement pump 26 to circuit 12, pump 18 and circuit 14. Excess hydraulic fluid, from pump 26 at high engine speeds, can then be fed to the main hydraulic pump 18 and to the main hydraulic circuit 10, or to the lubricating hydraulic circuit 12, 14. This reduces efficiency losses, since excess hydraulic fluid does not return unused into the hydraulic tanks 20.

Figure 3:
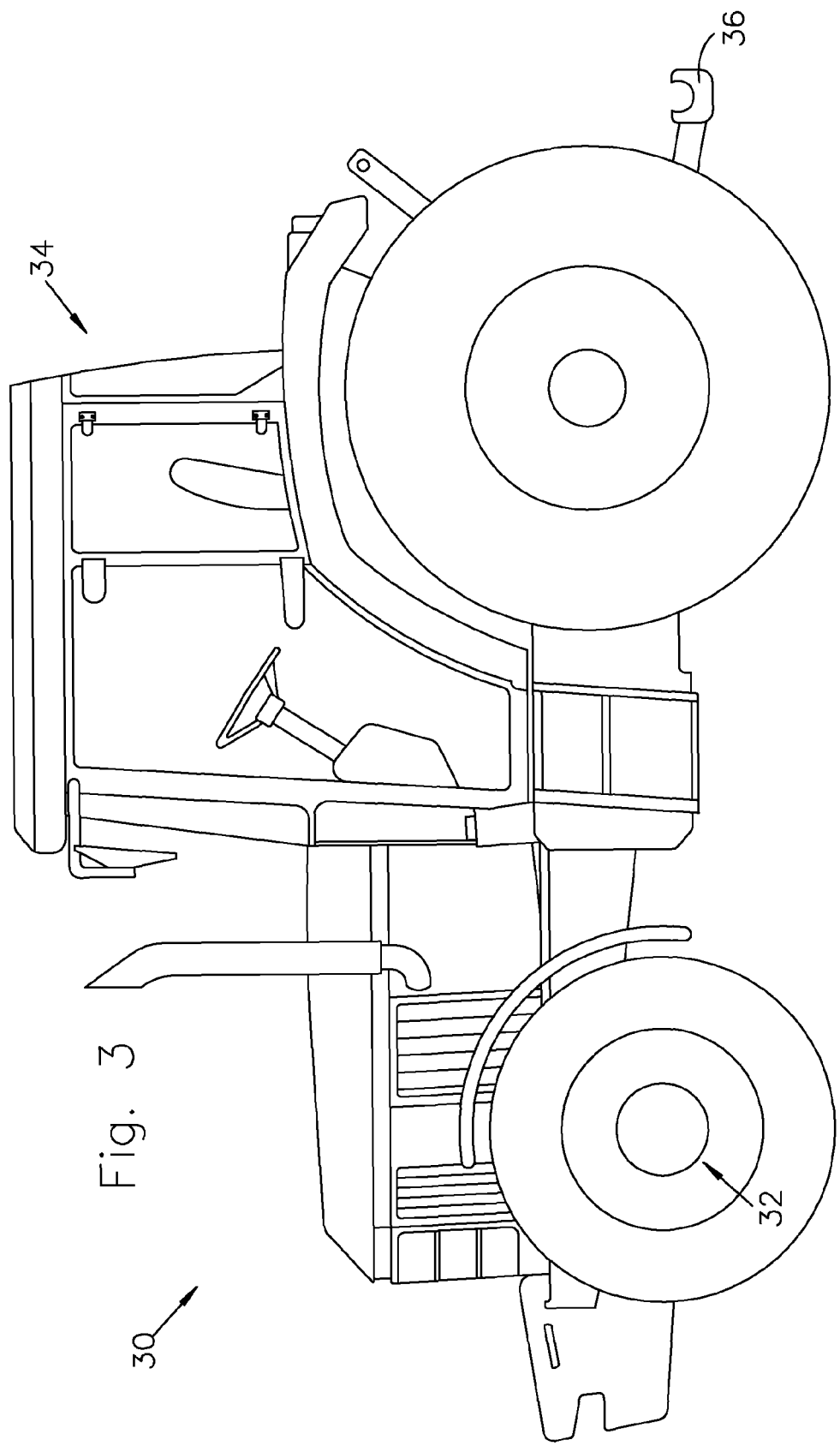
FIG. 3 is a diagrammatic side view of an agricultural vehicle having a hydraulic system according to the invention.

The hydraulic systems of FIG. 1 or 2 can be used with an agricultural tractor 30 of FIG. 3. The tractor 30 has a hydraulically sprung front axle 32 and a hydraulically sprung cab 34. The tractor 30 further has a hydraulically operated transmission (not shown) and further components supplied by the main hydraulic circuit 10, such as control valves (not shown), steering hydraulics 29, brake hydraulics 31, and a coupling device 36 controlled by hitch control circuit 35.

The variable or adjustable charge pump 22 is set such that, in the charge pressure hydraulic circuit, a certain charge pressure is always reached, which is maintained by the charge pump by alteration of the delivery volume. The main hydraulic pump 18 is connected to this charge pressure circuit, and as soon as the main hydraulic pump 18 increases its delivery rate and hence its absorption volume, the pressure in the charge pressure circuit collapses and the charge pump 22 increases its delivery volume in order to restore the preset charge pressure. The lubricating hydraulic circuits 12, 14 are arranged so that from the charge pump 22, via preferably pressure-relief valves (not shown), hydraulic fluid can flow off to the lubricating hydraulic circuit 12, 14, so that the vehicle transmission (not shown) can receive a constant quantity of lubricating fluid over the entire engine speed range.

The pressure-relief valves (not shown) are preferably set, with due regard to the pressure losses in the lubricating fluid lines (here a plurality of differently set pressure-relief valves may possibly be necessary), such that their opening pressure, depending on the necessary quantity of lubricating fluid, lies beneath the set charge pressure. Thus, a constant volumetric flow will flow off for lubrication purposes (since the pressure gradient between the charge pressure circuit and the lubricating oil outlet remains constant), since the adjustable charge pump 22 is intent on balancing the effluent quantity of lubricating fluid by maintaining a preset charge pressure.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hydraulic system for an agricultural vehicle having a main hydraulic pump which supplies hydraulic fluid to a main hydraulic circuit, a charge pump which supplies fluid to the main hydraulic pump, and a lubricating hydraulic circuit, characterized by:
   the charge pump is a variable displacement charge pump;
   a branch line which communicates a portion of the hydraulic fluid delivered by the charge pump to the lubricating hydraulic circuit;
   a transmission shift control circuit; and
   a further branch line which communicates fluid from the main hydraulic pump to the transmission shift control circuit.

2. A hydraulic system for an agricultural vehicle having a main hydraulic pump which supplies hydraulic fluid to a main hydraulic circuit, a charge pump which supplies fluid to the main hydraulic pump, and a lubricating hydraulic circuit, characterized by:
   the charge pump is a variable displacement charge pump; and
   a branch line which communicates a portion of the hydraulic fluid delivered by the charge pump to the lubricating hydraulic circuit;
   a transmission shift control circuit; and a fixed displacement pump for supplying fluid to the transmission shift control circuit.

3. The hydraulic system of claim 2, further comprising:
a further branch line which communicates fluid from the fixed displacement pump to an inlet of the main hydraulic pump).

4. The hydraulic system of claim 2, further comprising:
a further branch line which communicates fluid from the fixed displacement pump to the lubricating hydraulic circuit.

* * * * *